Figures 1, 2:
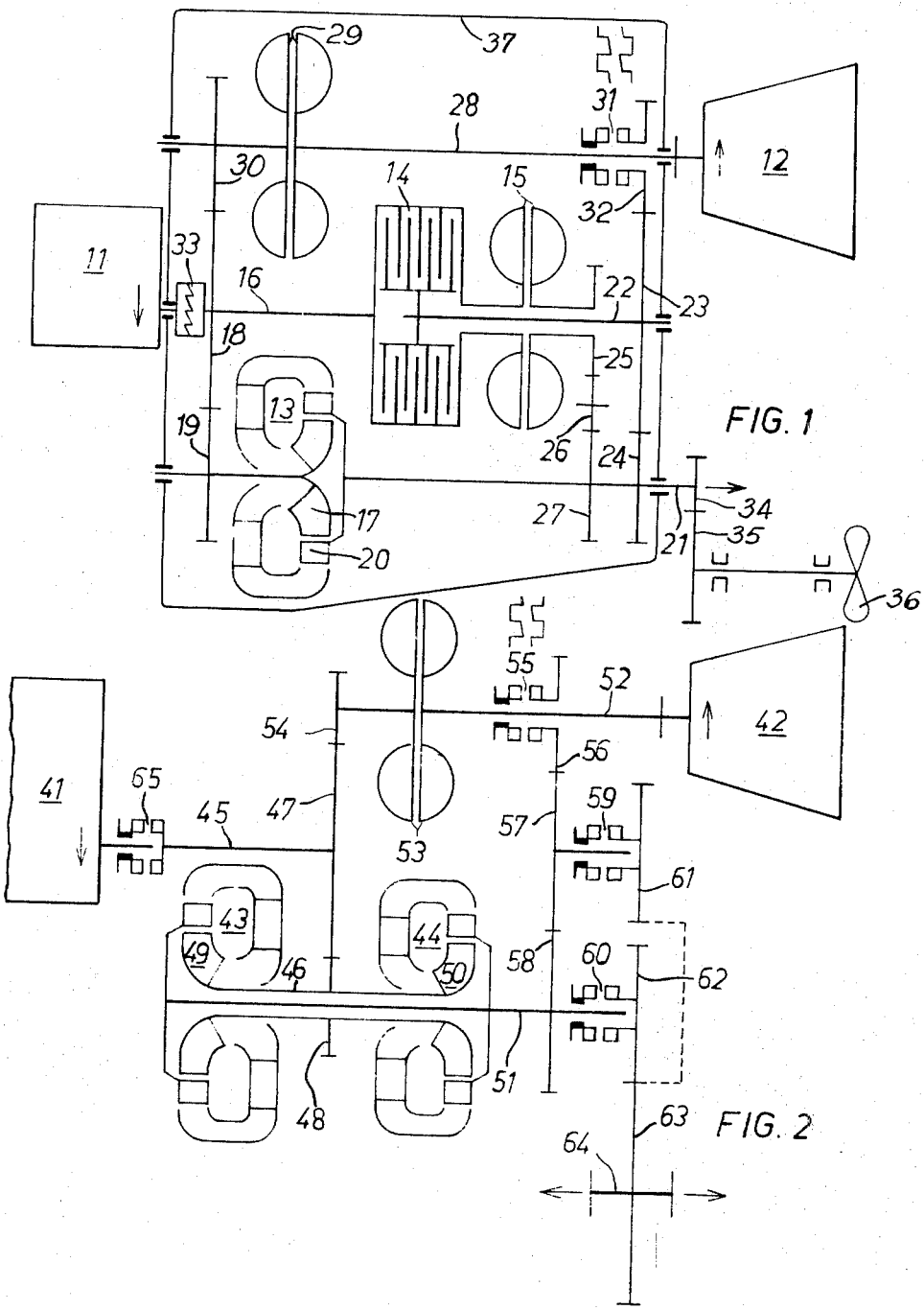

United States Patent
Gros

[15] 3,683,719
[45] Aug. 15, 1972

[54] REVERSING TRANSMISSION WITH DUAL INPUTS

[72] Inventor: Hermann Gros, Friedrichshafen, Germany

[73] Assignee: Motoren- und Turbinen-Union Friedrichshafen GmbH, Friedrichshafen, Germany

[22] Filed: May 13, 1970

[21] Appl. No.: 36,754

[30] Foreign Application Priority Data

May 14, 1969 Germany..........P 19 24 482.0

[52] U.S. Cl. ..........................74/661, 60/11, 74/720, 192/3.25, 192/48.5
[51] Int. Cl..............................................F16h 37/06
[58] Field of Search........74/661, 675, 687, 688, 718, 74/720; 192/3.25; 60/11, 6, 12, 39.14, 39.15

[56] References Cited

UNITED STATES PATENTS

| 3,388,684 | 6/1968 | Gros et al. ...............74/661 X |
| 2,781,674 | 2/1957 | Kaerger.......................74/661 |
| 3,373,634 | 3/1968 | Schrag.........................74/661 |
| 3,377,876 | 4/1968 | Finke et al...............74/661 X |
| 3,495,478 | 2/1970 | Livezey.......................74/661 |

Primary Examiner—Benjamin W. Wyche
Attorney—Craig, Antonelli & Hill

[57] ABSTRACT

A drive installation including two driving engines and a transmission having an input and an output shaft. The first driving engine is connected to the input shaft by way of an engageable clutch; such as a one-way clutch or a clam clutch. The second driving engine is connected to both the input shaft of the transmission by way of a first engageable coupling and to the output shaft of the transmission by way of a second engageable coupling. The transmission is operable to selectively connect either engine or both engines for driving the output of the transmission.

7 Claims, 2 Drawing Figures

INVENTOR
Hermann Gros

BY Gray, Antonelli, Stewart & Hill
ATTORNEYS

REVERSING TRANSMISSION WITH DUAL INPUTS

The present invention relates to a drive or propulsion installation with two driving engines and a transmission having a variable transmission ratio.

The first driving engine, for example, a Diesel engine, serves the purpose of economical continuous operation. The second driving engine, for example, a gas turbine, is put additionally into operation for achieving a maximum propulsion or driving power. The transmission serves for matching the changing torque requirement to the torque supply of the driving engines.

It is quite feasible to coordinate to each driving engine a separate transmission, by means of which the respective driving engine can be selectively engaged and disengaged and operated in an optimum manner. This approach, however, is excessively costly.

It is known to feed-in the torque of the second driving engine in front of the transmission, i.e., in the input of the transmission. However, in this case the transmission unit has to be constructed for the transfer of the entire output of both driving engines and as a result thereof, becomes excessively costly.

Drive installations are furthermore known in the prior art in which the torque of the additional driving engine is fed-in to the rear of the transmission, i.e., in the output of the transmission. However, the output of the second driving engine can be utilized thereby only in the middle and upper output rotational speed range of the transmission by reason of the characteristics thereof.

The aim of the present invention essentially resides in so constructing the drive installation that it can be operated both with the first as also with the second driving engine, and that in case of maximum power requirement, the second driving engine can be connected in an operationally reliable manner in the middle and upper output rotational speeds of the transmission in addition to the first driving engine, and, corresponding to the requirements, can be disconnected again.

The underlying problems are solved in accordance with the present invention in that a drive connection from the second driving engine is present both with respect to the input shaft of the transmission by way of a shiftable clutch, preferably a hydrodynamic coupling, as also with respect to the output shaft of the transmission by way of an engageable, preferably a form-locking, clutch.

The advantages of the present invention reside in that with relatively slight expenditures all required operating conditions can be achieved:

1. Starting and operation either with the first driving engine or with the second driving engine by way of the transmission;
2. Operation with the first driving engine by way of the transmission and feed-in of the output of the second driving engine directly and without power loss to the output shaft;
3. Operation with the second driving engine alone and directly on the output shaft of the transmission;
4. Operation of both driving engines directly on the output shaft of the transmission;
5. Synchronization and relief of the form-locking clutch by the hydrodynamic coupling during shifting;
6. Starting of one driving engine by the other.

The operation of the driving installation by means of the second driving engine alone is made possible in that the first driving engine is connected with the input shaft of the transmission by way of an engageable clutch or that the engageable clutch between the first driving engine and in the input shaft of the transmission is constructed as free-wheeling clutch or one-way device.

A favorable arrangement for the ships' propulsions is achieved in that a torque converter is provided in the transmission for the purpose of the matching of the rotational speeds and torques of the driving engine, for the propulsion under partial load conditions and for the acceleration of the propeller shaft, in that additionally a lamellae clutch is provided for the direct drive and in that a hydrodynamic coupling with a gear set is provided for the reversal of the direction of rotation for changing from forward to reverse and for the reverse propulsion.

An arrangement advantageous for a rail power-propelled vehicle includes a transmission with one or several hydrodynamic circulations, to the output of which is connected a mechanical reversing gear.

By the use of the reversing gear connected to the output of the transmission, the second driving engine can be additionally connected in both driving directions. The reversing gear is not overloaded thereby because the torque during the starting by way of the hydrodynamic transmission with the first or second driving engine is larger than the common torque of both driving engines in the middle or upper speed range.

According to a further feature of the present invention, the transmission, the drive connection from the second driving engine to the input and output shaft of the transmission and possibly the reversing gear are accommodated in a common housing. This measure results in a space-and weight-saving construction of the entire installation.

These and further objects, features and advantages of the present invention will become more obvious from the following description when taken in connection with the accompanying drawing which shows, for purposes of illustration only, two embodiments in accordance with the present invention, and wherein:

FIG. 1 is a schematic view of a ship's propulsion installation in accordance with the present invention; and FIG. 2 is a schematic view of a drive installation for a motor-driven rail vehicle.

Referring now more particularly to FIG. 1, a ship's propulsion installation with a Diesel engine 11 as first driving engine and with a gas turbine 12 as second driving engine is illustrated in this figure. The Diesel engine 11 of conventional construction is intended for the economic continuous or cruising operation whereas the gas turbine 12 of any conventional construction having a relatively high output is intended for the high-speed operation. The transmission contains a hydrodynamic torque converter 13 of conventional construction and a lamellae clutch 14 for the forward propulsion and a hydrodynamic coupling 15 for the reverse propulsion. A speed-up gear with the gear wheels 18 and 19 is arranged between the transmission input shaft 16 and the pump wheel 17 of the torque converter 13. The turbine wheel 20 of the torque converter 13 is mounted on the transmission output shaft 21.

The primary part of the lamellae clutch 14 and of the hydrodynamic coupling 15 is arranged on the drive or input shaft 16 for common rotation therewith. A shaft 22 coaxial to the drive shaft 16 carries the secondary part of the lamellae clutch 14 and is connected by way of the gear wheels 23 and 24 with the drive shaft 21. The secondary part of the coupling 15 is also operatively connected with the output shaft or driven shaft 21 by way of the gear wheel 25, intermediate gear 26 and gear wheel 27.

An engageable drive connection from the gas turbine 12 exists both with respect to the input shaft 16 of the transmission by way of a shaft 28, a hydrodynamic coupling 29 and the pair of gears 30/18 as also with respect to the output or driven shaft 21 of the transmission by way of a conventional claw clutch 31 and gears 32, 23, and 24.

The free-wheeling or one-way clutch 33 of any conventional construction is arranged between the Diesel engine 11 and the transmission input shaft 16.

Additional gearing steps providing a change in transmission ratio (not illustrated) may be provided between the output shaft 21 of the transmission and the propeller (not shown).

OPERATION

The operation of the installation illustrated in FIG. 1 is as follows:

The Diesel engine 11 drives by way of the free-wheeling or one-way clutch 33 the input shaft 16 of the transmission. The one-way clutch 33 can also be constructed as a claw clutch adapted to be engaged in the standstill and serves the purpose to disconnect the Diesel engine 11, if one is to operate exclusively by means of the gas turbine 12.

For the starting, the hydrodynamic torque converter 13 is filled with operating liquid. The Diesel engine 11 drives the pump wheel 17 of the torque converter 13 by way of the speed-up gear pair 18/19. The secondary moment of the torque converter resulting in the turbine wheel 20 accelerates the output shaft 21 and thus the propeller shaft connected by way of gears and therewith the propeller.

For the normal cruising operation, the lamellae clutch 14 is thereafter engaged and the torque converter 13 is emptied by conventional means. The Diesel engine 11 now drives the propeller by way of the one-way clutch 33, lamellae clutch 14, gears 23 and 24 and the output shaft 21. The installation thereby operates with a high efficiency.

For purposes of shifting from forward to reverse, the lamellae clutch 14 is disengaged and the hydrodynamic coupling 15 is filled by conventional means. Since the secondary part of this coupling 15 is operatively connected with the output shaft 21 by way of the three gears 25, 26, 27, in contrast to the secondary part of the lamellae clutch 14 which is connected to the output shaft 21 by way of the two gears 23 and 24, a reversal of the direction of the rotation of the propeller takes place thereby.

For shifting from reverse to forward the coupling 15 is again emptied in a conventional manner and the torque converter 13 is again filled.

For starting the gas turbine 12, the hydrodynamic coupling 29 is filled by conventional means.

After the starting, the gas turbine 12 can operate by way of the coupling 29 in the same manner as the Diesel engine 11 by way of the transmission. The Diesel engine 11 may then be disconnected and stopped by disengagement of the free-wheeling clutch 33.

In the interest of small dimension and for purposes of saving weight, the transmission unit is designed and constructed preferably only for transmitting the torque of the Diesel engine 11. If the gas turbine 11 operates by way of the hydrodynamic transmission, then the gas turbine torque is correspondingly limited.

The gas turbine 12 can also operate directly on the output shaft 21 by way of the claw clutch 31 and the gears 32, 23 and 24. For purposes of engaging the claw clutch 31, the latter may be synchronized by way of the hydrodynamic coupling 29, the gears 30 and 18, the lamellae clutch 14 and the gears 23 and 32. The transmission ratio of the gear pairs 30/18 and 23/32 is so chosen that with a started gas turbine 12, disengaged claw clutch 31 and nominal slippage of the coupling 29, the gear 32 together with the secondparty part of the claw clutch 31 rotates slightly faster than the shaft 28 together with the primary part of the claw clutch 31. As a result thereof, when the coupling 29 is filled with a rotating gas turbine 12, the primary part of the claw clutch 31 is overtaken by the engaged secondary part and the claw clutch can be brought into engagement. After the emptying of the coupling 29, the direct power path to the output shaft 21 is established.

For purposes of disengagement of the claw clutch 31, the hydrodynamic coupling 29 is filled and as a result thereof the claw clutch 31 is relieved. The disengagement offers thereby no difficulties.

During operation of both driving engines, the Diesel engine 11 operates by way of the torque converter 13 while the gas turbine 12 operates by way of the claw clutch 31 and the gears 32, 23, and 24 on the output shaft 21.

A higher propeller rotational speed results from the higher driving power of the two cooperating driving engines. However, the Diesel engine 11 can be operated thereby at its rated rotational speed by means of the torque converter 13.

A drive installation for a rail vehicle with two driving engines is illustrated in FIG. 2. A Diesel engine 41 is provided for the economic continuous drive while a gas turbine 42 is provided as additional drive in case of large inclines and for achieving maximum speeds in the plane, however, also for the operation as only drive means in case of failure of the Diesel engine.

The transmission consists of a torque converter 43 for the lower velocity range and of a torque converter 44 for the upper velocity range. A speed-up gear having gears 47 and 48 is arranged between the transmission input shaft 45 and the primary shaft 46 of the torque converters 43 and 44. The pump wheels 49 and 50 of the torque converters 43 and 44 are secured on the primary shaft 46. The turbine wheels are mounted on the output shaft 51 of the transmission.

An engageable drive connection from the gas turbine 42 exists both with respect to the input shaft 45 of the transmission by way of a shaft 52, a hydrodynamic coupling 53, and the gears 54 and 47 as also with respect to the output shaft 51 of the transmission by way of a claw clutch 55 and gears 56, 57 and 58. The reversing gear connected in the output consists of the reversing claw clutches 59 and 60 and the gears 61, 62 and 63. The gear 63 is secured on the output shaft 64. A claw clutch 65 is arranged between the Diesel engine 41 and the transmission input shaft 45.

OPERATION

The operation of the installation of FIG. 2 is as follows:

During normal operation, the torque of the Diesel engine 41 is transmitted by way of the claw clutch 65, the transmission input shaft 45, the speed-up pair of gears 47/48 to the pump wheel 49 or 50 of the corresponding torque converter 43 or 44 filled for the respective operating or driving velocity. The output shaft 51 of the transmission is driven by the turbine wheel of this respective torque converter 43 or 44.

Depending on the engaged reversing claw clutch 59 or 60, the power flow takes place either by way of gear pair 58/57, reversing claw clutch 59 and the gears 61 and 63 or by way of reversing claw clutch 60 and the gears 62 and 63 to the output shaft 64 of the reversing gear.

For purposes of starting the gas turbine 42, the hydrodynamic coupling 53 is conventionally filled.

After the starting, the gas turbine 42 can operate in the same manner as the Diesel engine 41 by way of the transmission. The Diesel engine 41 can be disconnected by way of disengagement of the claw clutch 65.

However, the gas turbine 42 can also operate directly on the output shaft 51 of the transmission by way of the claw clutch 55 and the gears 56, 57 and 58. The Diesel engine 41 may thereby operate simultaneously on the output shaft 51 of the transmission either by way of the transmission with the torque converters 43 or 44 or by way of the hydrodynamic coupling 53, claw clutch 55, and gears 56, 57, 58.

Particularly with the last-described possibility, an economic operation with both driving engines in the upper velocity range is possible.

The torques of the two driving engines are transmitted by way of a common reversing gear with the gear wheels 61, 62 and 63 and the reversing claw clutches 59 and 60 so that each operating possibility exists in both driving directions.

This reversing gear need not be constructed stronger compared to an installation that includes only one driving engine because the torque during the starting by way of the hydrodynamic transmission with the Diesel engine or with the gas turbine is larger than the common torque of the two driving engines in the middle and upper velocity range.

While I have shown and described only two embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An installation with two driving engines, each driving engine having an engine output shaft, and a transmission having a transmission input shaft and a transmission output shaft, the first driving engine's shaft being connected to the input shaft of the transmission, the second driving engine's output shaft being connected to both the input shaft of the transmission by way of a first engageable means and to the output shaft of the transmission by way of a second engageable means, the first driving engine being operatively connected with the input shaft of the transmission by way of a third engageable means, a mechanical reversing gear being connected to the output shaft of the transmission for selectively reversing the direction of rotation of said output shaft, characterized in that several hydrodynamic circulations are provided for transmitting power from said engines to said transmission output shaft.

2. A drive installation according to claim 1, characterized in that one hydrodynamic circulation is for a lower speed range connection between at least one of said engines and the transmission output shaft and another hydrodynamic circulation is for an upper speed range connection between at least one of said engines and the transmission output shaft for use on a rail propulsion vehicle.

3. An installation with two driving engines, each driving engine having an engine output shaft, and a transmission having a transmission input shaft and a transmission output shaft, the first driving engine's shaft being connected to the input shaft of the transmission, the second driving engine's output shaft being connected to both the input shaft of the transmission by way of a first engageable means and to the output shaft of the transmission by way of a second engageable means, the first driving engine being operatively connected with the input shaft of the transmission by way of a third engageable means, a mechanical reversing gear being connected to the output shaft of the transmission for selectively reversing the direction of rotation of said output shaft, characterized in that a common housing is provided for accommodating the at least one hydrodynamic coupling, a claw clutch between said hydrodynamic coupling and the second driving engine and associated further parts of the transmission.

4. An installation including first and second driving engines and a transmission having an input shaft and an output shaft; said transmission comprising: first engageable means for connecting the second driving engine to the transmission input shaft, second engageable means for connecting the second driving engine to the transmission output shaft, a hydrodynamic torque converter for operatively connecting and matching the two driving engines during partial loading and during acceleration of the output shaft, a lamellae clutch engageable with said input and output shafts for establishing a direct drive therebetween, and a hydrodynamic coupling operatively connected with a reversing gear set for selectively reversing the direction of rotation of the output shaft.

5. An installation according to claim 4, characterized in that the first driving engine is operatively connected with the input shaft by way of a third engageable means.

6. An installation according to claim 5, characterized in that the output shaft is operatively connected with the propeller of a ship's propulsion installation.

7. An installation according to claim 4, characterized in that the output shaft is operatively connected with the propeller of a ship's propulsion installation.

* * * * *